Jan. 17, 1967 J. W. LIGHTON ETAL 3,298,623
ROLLSTAND EQUIPMENT FOR UNWINDING AND REWINDING WEB MATERIAL
Filed April 9, 1964
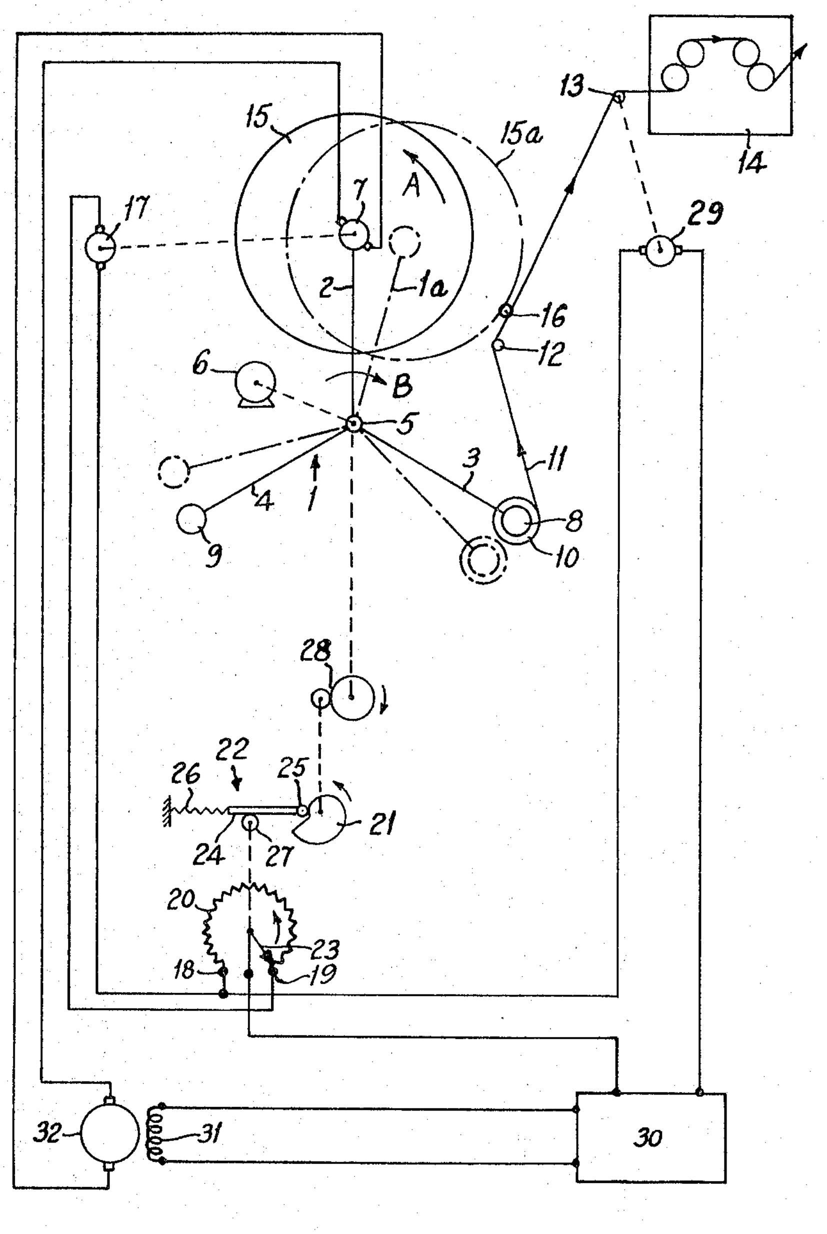
Inventors
John William Lighton
Leslie Frank Monte
By
Michael J. Striker
Attorney 3,298,623

ROLLSTAND EQUIPMENT FOR UNWINDING AND REWINDING WEB MATERIAL

John William Lighton, Romford, Essex, and Leslie Frank Moate, Brentwood, Essex, England, assignors to Fuller Electric Limited, London, England, a British company
Filed Apr. 9, 1964, Ser. No. 358,484
Claims priority, application Great Britain, Apr. 10, 1963, 14,300/63
26 Claims. (Cl. 248—58.2)

This invention relates to an improved rollstand equipment of the kind employed in the unwinding of reels of material in web form, or the rewinding of web material into reels, said equipment comprising a plurality of reel supporting arms (usually two or three) rotatable as a unit about the rollstand axis (which is usually horizontally disposed) and means on each arm for supporting a reel for rotation about an axis substantially parallel to the rollstand axis.

When using such rollstand equipment in the continuous processing of reels of web material (for example, paper web), a running reel of web material being unwound and fed to a processing machine (for example, a printing press) is mounted on one arm of the rollstand and a new reel of the web material is mounted on another arm. When the running reel has almost expired the rollstand equipment is employed to splice the web of the new reel to the travelling web of the expiring running reel. To enable such a splicing operation to be performed, the rollstand comprises means for rotating the new reel so that its peripheral velocity is equal to the linear velocity of the expiring web. When the two velocities are equal, the rollstand is rotated about its axis to bring the peripheral surface of the new reel into contact with the expiring web so that an adhesive area on the new reel adheres to the expiring web and the two webs become spliced together.

The expiring web is then severed by a suitable knife means and web material is unwound from the new reel without any interruption of the feed of material to the processing machine.

Apart from being employed in reel unwinding processes as described above, rollstand equipment of the kind referred to is also used for rewinding web material into reel form. In this case, when a running reel core on the rollstand has been wound with web material to the required diameter, the rollstand equipment is rotated to bring a new reel core into contact with the travelling web so that an adhesive area on the new reel core adheres to the web and the latter is spliced to the new reel core. As the splicing operation is performed, the web is severed by a suitable knife means in a region between the two reel cores and the web material is then wound on to the new reel core. In this case it is necessary for the peripheral velocity of the new reel core to be equal to the linear velocity of the travelling web when the splicing operation is performed.

Whilst the ensuing description is concerned mainly with the unwinding of web material from reels, it will be appreciated that rollstand equipment in accordance with the invention is equally suitable for rewinding web material into reels.

In the use of rollstand equipment of the kind referred to for performing the above described splicing operation during a web unwinding process, it will be appreciated that it is essential to be able to control the speed of rotation of the new reel prior to the splicing operation so that the peripheral velocity of the new reel can be adjusted to be equal to the linear velocity of the expiring web. If all the new reels fed to the rollstand had exactly the same diameter it would be a simple matter to control the reel speed employing a device which sensed the angular velocity of the reel. In practice, however, the new reels fed to the rollstand have a wide range of diameters and to allow for this fact it has been the practice hitherto to adjust the speed of rotation of the new reel by means of a control system employing some form of tachometer which is arranged to be driven mechanically by the peripheral surface of the new reel. These known systems utilise either a belt or a small wheel in direct contact with the peripheral surface of the new reel, which belt or wheel can be coupled to the tachometer either directly or via some suitable transmission means comprising gears or flexible cables. These known tachometer systems have many drawbacks, among the more serious of which are:

(a) The mechanical design of the system makes it difficult to adapt it to a wide range of new reel diameters.

(b) Any form of surface-driven tachometer is very vulnerable to mechanical damage from external sources or from irregularities in the reel itself.

(c) It is necessary to prepare the new reel in such a way that the tachometer drive cannot come into contact with the adhesive area of the reel which has to be spliced to the expiring web. This means that the adhesive area cannot extend across the entire width of the web of the new reel with a consequent decrease in the strength of the splice obtained.

(d) With the tachometer drive resting on the new reel, any adjustment of the reel in the direction of its axis of rotation while the reel is stationary (for the purpose of adjusting the web of the new reel laterally into alignment with the expiring web) causes damage to the prepared reel surface and this may give rise to failure of the joint made subsequently between the two webs.

(e) The tachometer drive usually engages the peripheral surface of the new reel adjacent to one end of the reel. Consequently, when the reel width is changed the position of the tachometer drive must be adjusted. Should this adjustment be forgotten, no reference is obtained when the new reel starts to rotate and serious damage can occur due to overspeeding of the new reel.

The present invention provides an improved rollstand equipment of the kind referred to.

According to the invention a rollstand equipment of the kind referred to comprises an electric motor for rotating a first reel on one arm of the equipment, means for producing an electrical quantity proportional to the angular velocity of the first reel, means for rotating the rollstand from a reference position to a web-splicing position, means for deriving from said quantity and from the arc of travel of the first reel in moving from said reference position to said splicing position a first electrical reference quantity proportional to the peripheral velocity of the first reel, means for producing a second electrical reference quantity proportional to the linear velocity of web material being unwound from or wound on to a second reel on another arm of the equipment, and means responsive to the two reference quantities for controlling the speed of said electric motor.

In the application of the invention to the unwinding of web material it will be understood that said first reel is a new full reel of web material and that said second reel is a reel from which the web material is being unwound. On the other hand, in the application of the invention to the rewinding of web material, said first reel is an empty reel and said second reel is a reel on to which web material is being wound.

In rollstand equipment in accordance with the invention the arc of travel of the first reel in moving from said reference position to the splicing position will be dependent on the diameter of the first reel. Consequently, said first electrical reference quantity can be made proportional to the diameter of the first reel. Since the first electrical reference quantity is derived from an electrical quantity which is proportional to the angular velocity of the first reel, it will therefore be seen that this first electrical reference quantity can be made proportional both to the angular velocity of the first reel and to its diameter. In other words, the first electrical reference quantity can be proportional to the peripheral velocity of the first reel.

Preferably, the quantity proportional to the angular velocity of the first reel and both of said reference quantities are voltages. A suitable means for producing a voltage proportional to the angular velocity of the first reel is a tachometer generator driven by the shaft of the first reel or by said electric motor. Alternatively, this voltage may be obtained directly from the armature of said electric motor. A suitable means for producing a voltage proportional to the linear velocity of the web material being unwound from, or wound on to, the second reel (i.e., said second electrical reference quantity) is a tachometer generator driven directly or indirectly by the web. Alternatively, this second reference voltage may be obtained from a tachometer generator driven by the shaft of a roll around which the web passes, for example, in the case of unwinding a web, a roll of a printing press to which the web is being fed. Again, this second reference voltage may be obtained from the armature of a motor driving a roll around which the web passes.

The means for deriving the first electrical reference quantity may comprise a potentiometer across the outer terminals of which is applied a voltage proportional to the angular velocity of the first reel. The movable contact of this potentiometer is adjusted in dependence on the length of the arc of travel of the first reel from said reference position to said splicing position and the first electrical reference quantity is withdrawn as a voltage from between the movable contact and one of the outer terminals of the potentiometer.

The two reference voltages may be fed to a conventional regulator which controls the driving motor of the first reel in dependence on the difference between the two reference voltages. For example, the output of the regulator may control the field strength of a generator supplying the reel driving motor. Immediately after the splicing operation is completed the control of the reel driving motor is disconnected from said regulator and connected instead to another regulator for controlling the tension of the web being unwound from, or wound on to, the first reel.

One form of rollstand equipment in accordance with the invention will now be described, by way of example, with reference to the accompanying drawing, the single figure of which is a schematic diagram of the equipment.

In the drawing, the reference numeral 1 generally designates a rollstand comprising three reel supporting arms 2, 3 and 4 rotatable as a unit about the rollstand axis 5 by means of an electric motor 6. An electric motor 7, 8 and 9 is mounted at the free end of each of the arms 2, 3 and 4, respectively, these motors serving to drive reel supporting shafts (not shown) disposed in bearings at the free end of each of the arms and having their longitudinal axes disposed parallel to the axis 5.

The drawing shows an almost expired reel 10 of paper web 11 mounted on the arm 3, and the web 11 being drawn from the reel 10 over rolls 12 and 13 by a printing press 14. A new reel 15 of paper web is shown mounted on the arm 2.

Before the reel 10 becomes finally exhausted, the reel 15 is set in rotation by the motor 7, the peripheral speed of the reel being adjusted, as described hereinafter, to a value equal to the linear speed of the expiring web 11. The direction of rotation of the reel 15 is indicated by arrow A.

Immediately before the reel 10 is finally exhausted, the rollstand is rotated by the motor 6 in the direction of the arrow B from a reference position, shown in full lines, to a web-splicing position, shown in chain dotted lines and designated by the reference numeral 1*a*. In this splicing position of the rollstand the peripheral surface 15*a* of the reel 15 lies close to the expiring web 11. The amount through which the rollstand has to be rotated to move it from the reference position to the web-splicing position will depend on the diameter of the reel 15. The arrival of the peripheral surface 15*a* of the reel at the web-splicing position may be detected by any suitable detector 16 which is arranged to emit a signal which is used to cut off the supply to the rollstand driving motor 6. The detector 16 may be a photoelectric device or an ultrasonic sound beam device.

A tachometer generator 17 is driven by the motor 7, this generator thus generating a voltage which is proportional to the angular velocity of the reel 15. This voltage is supplied to the outer terminals 18, 19 of a potentiometer 20. The latter may be of the standard toroidal type with linear or non-linear ohmic adjustment.

Rotation of the rollstand 1 from the reference position to the web-splicing position causes rotation of a cam 21 and a cam follower 22 which engages the cam 21 is arranged to adjust the position of the movable contact 23 of the potentiometer 20. The cam follower 22 comprises a toothed rack 24 having a roller 25 at one end which is urged lightly against the cam 21 by a spring 26, the rack 24 being movable in the direction of its longitudinal axis by the cam. The rack 24 meshes with a toothed pinion 27 which drives the potentiometer contact 23.

The driving connection between the rollstand 1 and the cam 21 comprises a reduction gear 28 which is so designed that when a new reel 15 of maximum diameter is mounted on arm 2, rotation of the rollstand to the web-splicing position results in negligible rotation of the cam, whereas when a new reel 15 of minimum diameter is mounted on the arm 2, rotation of the rollstand to the web-splicing position results in slightly less than one full turn of the cam. The displacement diagram of the cam 21 is designed so that the position of the movable contact 23 of the potentiometer is dependent on the diameter of the new reel 15. Consequently, since the tachometer generator 17 supplies a voltage to the terminals 18, 19 which is proportional to the angular velocity of the new reel 15, a voltage can be taken from the contact 23 and the terminal 18 which is proportional both to the angular velocity of the reel and to the diameter of the reel. In other words, the voltage across the contact 23 and terminal 18, which is the previously mentioned first reference voltage, is proportional to the peripheral speed of the surface 15*a* of the new reel 15.

A second tachometer generator 29 is arranged to be driven by the roll 13. The peripheral velocity of the roll 13, which is a positively driven roll, is always equal to the linear velocity of the paper web 11. Consequently, the generator 29 generates a voltage which is proportional to the linear speed of web 11. This voltage is the second reference voltage referred to above.

The difference between the first and second reference voltages is applied to the input of a regulator 30 which controls the voltage applied across the field winding 31 of a generator 32. The output of the generator 32 is fed to the reel motor 7. When the voltage across the contact 23 and terminal 18 bears a certain relationship to the output voltage of generator 29, for example when these two voltages are equal, the peripheral speed of the new reel 15 will be equal to the linear speed of web 11 and the regulator 30 makes no adjustment of the voltage applied to the field winding 31. If the relationship between these two voltages is disturbed, due to the new reel 15 rotating too quickly or too slowly, the regulator 30 adjusts the voltage applied to the field winding 31 in a direction to restore the correct relationship between the two voltages.

When the reel 15 is rotating at the correct speed at the web-splicing position, the web 11 is moved against the peripheral surface 15a of the reel and a previously prepared adhesive area on the surface 15a adheres to the web 11. A knife (not shown) then cuts the web 11 and the printing press 14 then draws paper web from the new reel 15.

The rollstand equipment described with reference to the drawing does not comprise a tachometer driven by the peripheral surface of the new reel and therefore the drawbacks mentioned above under (a) to (e) are all eliminated. If a tachometer generator driven by the expiring web is employed to produce said second electrical reference quantity then the drawbacks mentioned above under (a), (c) and (d) do not apply and it is possible to mount the tachometer generator in such a position that drawbacks (b) and (e) are largely, if not entirely, eliminated. As mentioned above, and illustrated in the drawing, however, it is not essential to employ a tachometer generator driven directly by the expiring web for producing the second reference quantity.

It will be appreciated that the rollstand equipment described with reference to the drawing can be used equally well for rewinding web material. Let it be imagined, with reference to the drawing, that the web 11 is travelling in the opposite direction and is being wound onto the reel 10. In this case an empty reel core is mounted on arm 2 and when the reel 10 is full the empty reel core is moved into the web-splicing position. Prior to the splicing of the web 11 to the empty reel core the peripheral speed of the latter must be the same as the linear velocity of the web 11, and this speed equality is achieved by adjusting the speed of rotation of the empty reel in exactly the same way as previously described with reference to the unwinding of web materials.

When used, therefore for rewinding web material into reels, a rollstand equipment in accordance with the invention comprises an electric motor for rotating a new reel core on one arm of the equipment, means for producing an electrical quantity proportional to the angular velocity of the new reel core, means for rotating the rollstand from a reference position to a web-splicing position, means for deriving from said quantity and from the arc of travel of the new reel core in moving from said reference position to said splicing position a first electrical reference quantity proportional to the peripheral velocity of the new reel core, means for producing a second electrical reference quantity proportional to the linear velocity of web material being wound on to a further reel core on another arm of the equipment, and means responsive to the two reference quantities for controlling the speed of said electric motor.

What is claimed is:

1. Rollstand equipment of the kind employed in the unwinding of reels of material in web form, said equipment comprising a rollstand having an axis, a plurality of reel supporting arms forming a unit and being mounted on said rollstand for rotation about the rollstand axis, means on each arm for supporting a reel for rotation about an axis substantially parallel to said rollstand axis, an electric motor for rotating a new reel of web material on one arm of the equipment, means for producing an electrical quantity proportional to the angular velocity of the new reel, means for rotating said unit from a reference position to a web-splicing position, means for deriving from said quantity and from the arc of travel of the new reel in moving from said reference position to said splicing position a first electrical reference quantity proportional to the peripheral velocity of the new reel, means for producing a second electrical reference quantity proportional to the linear velocity of web material being unwound from an expiring reel on another arm of the equipment, and means responsive to the two reference quantities for controlling the speed of said electric motor in order to adjust the peripheral velocity of said new reel to be substantially the same as the linear velocity of the web material being unwound from said expiring reel.

2. Rollstand equipment of the kind employed in rewinding of web material into reels, said equipment comprising a rollstand having an axis, a plurality of reel supporting arms forming a unit and being mounted on said rollstand for rotation about the rollstand axis, means on each arm for supporting a reel core for rotation about an axis substantially parallel to said rollstand axis, an electric motor for rotating a new reel core on one arm of the equipment, means for producing an electrical quantity proportional to the angular velocity of the new reel core, means for rotating said unit from a reference position to a web-splicing position, means for deriving from said quantity and from the arc of travel of the new reel core in moving from said reference position to said splicing position a first electrical reference quantity proportional to the peripheral velocity of the new reel core, means for producing a second electrical reference quantity proportional to the linear velocity of web material being wound on to a further reel core on another arm of the equipment, and means responsive to the two reference quantities for controlling the speed of said electric motor in order to adjust the peripheral velocity of said reel core to be substantially the same as the linear velocity of the web material being wound onto said further reel core.

3. Rollstand equipment according to claim 1, in which the means for producing said first mentioned electrical quantity is a tachometer generator.

4. Rollstand equipment according to claim 3, in which the tachometer generator is driven by said electric motor.

5. Rollstand equipment according to claim 1, in which said first mentioned electrical quantity is a voltage derived from said electric motor.

6. Rollstand equipment according to claim 3, in which the means for deriving said first electrical reference quantity is a potentiometer having outer terminals across which the voltage generated by said tachometer generator is applied and a movable contact which is adjustable in dependence on the length of said arc of travel, the first electrical reference quantity being withdrawn as a voltage appearing across the movable contact and one of the outer terminals of the potentiometer.

7. Rollstand equipment according to claim 3, in which the means for producing said second electrical reference quantity is a further tachometer generator driven by the web.

8. Rollstand equipment according to claim 3, in which the means for producing said second electrical reference quantity is a further tachometer generator driven by a roll around which the web passes.

9. Rollstand equipment according to claim 6, wherein said means for deriving a first electrical reference quantity includes a cam mechanism for adjusting the position of the movable contact of the potentiometer, and means for rotating said cam mechanism in response to rotation of the rollstand about its axis.

10. Rollstand equipment according to claim 7, in which the output voltages of the two tachometer generators are fed to a regulator comprising means to control the speed of said electric motor in dependence on the difference between the two voltages.

11. Rollstand equipment according to claim 10 comprising a generator supplying said electric motor and in which said regulator controls the field strength of said generator.

12. Rollstand equipment according to claim 3, in which the tachometer generator is driven by said new reel.

13. Rollstand equipment according to claim 12, in which the means for deriving said first electrical reference quantity includes a potentiometer having outer terminals across which the voltage of said tachometer generator is applied and a movable contact which is adjustable in dependence on the length of said arc of travel, the first electrical reference quantity being withdrawn as a voltage appearing across the movable contact and one of the outer terminals of the potentiometer.

14. Rollstand equipment according to claim 13, wherein said means for deriving said first electrical reference quantity includes a cam mechanism for adjusting the position of the movable contact of the potentiometer and means for rotating said cam mechanism in response to rotation of the rollstand about its axis.

15. Rollstand equipment according to claim 5, in which the means for deriving said first electrical reference quantity includes a potentiometer having outer terminals across which the voltage of said tachometer generator is applied and a movable contact which is adjustable in dependence on the length of said arc of travel, the first electrical reference quantity being withdrawn as a voltage appearing across the movable contact and one of the outer terminals of the potentiometer.

16. Rollstand equipment according to claim 15, wherein said means for deriving said first electrical reference quantity includes a cam mechanism for adjusting the position of the movable contact of the potentiometer and means for rotating said cam mechanism in response to rotation of the rollstand about its axis.

17. Rollstand equipment according to claim 2, in which the means for producing said first mentioned electrical quantity includes a tachometer generator.

18. Rollstand equipment according to claim 17, in which the tachometer generator is driven by said electric motor.

19. Rollstand equipment according to claim 18, in which the means for deriving said first electrical reference quantity includes a potentiometer having outer terminals across which the voltage of said tachometer generator is applied and a movable contact which is adjustable in dependence on the length of said arc of travel, the first electrical reference quantity being withdrawn as a voltage appearing across the movable contact and one of the outer terminals of the potentiometer.

20. Rollstand equipment according to claim 19, wherein said means for deriving said first electrical reference quantity includes a cam mechanism for adjusting the position of the movable contact of the potentiometer and means for rotating said cam mechanism in response to rotation of the rollstand about its axis.

21. Rollstand equipment according to claim 17, in which the tachometer generator is driven by said new reel core.

22. Rollstand equipment according to claim 21, in which the means for deriving said first electrical reference quantity includes a potentiometer having outer terminals across which the voltage of said tachometer generator is applied and a movable contact which is adjustable in dependence on the length of said arc of travel, the first electrical reference quantity being withdrawn as a voltage appearing across the movable contact and one of the outer terminals of the potentiometer.

23. Rollstand equipment according to claim 22, wherein said means for deriving said first electrical reference quantity includes a cam mechanism for adjusting the position of the movable contact of the potentiometer and means for rotating said cam mechanism in response to rotation of the rollstand about its axis.

24. Rollstand equipment according to claim 2, in which said first mentioned electrical quantity is a voltage derived from said electric motor.

25. Rollstand equipment according to claim 24, in which the means for deriving said first electrical reference quantity includes a potentiometer having outer terminals across which the voltage of said tachometer generator is applied and a movable contact which is adjustable in dependence on the length of said arc of travel, the first electrical reference quantity being withdrawn as a voltage appearing across the movable contact and one of the outer terminals of the potentiometer.

26. Rollstand equipment according to claim 25, wherein said means for deriving said first electrical reference quantity includes a cam mechanism for adjusting the position of the movable contact of the potentiometer and means for rotating said cam mechanism in response to rotation of the rollstand about its axis.

References Cited by the Examiner

UNITED STATES PATENTS

| | | | |
|---|---|---|---|
| 2,601,071 | 6/1952 | Tollison | 242—58.2 |
| 2,963,234 | 12/1960 | Chase et al. | 242—58.3 |

FRANK J. COHEN, *Primary Examiner.*

MERVIN STEIN, *Examiner.*

W. S. BURDEN, *Assistant Examiner.*